United States Patent [19]
Rockwell

[11] Patent Number: 5,483,342
[45] Date of Patent: Jan. 9, 1996

[54] POLARIZATION ROTATOR WITH FREQUENCY SHIFTING PHASE CONJUGATE MIRROR AND SIMPLIFIED INTERFEROMETRIC OUTPUT COUPLER

[75] Inventor: David A. Rockwell, Santa Monica, Calif.

[73] Assignee: Hughes Aircraft Company, Los Angeles, Calif.

[21] Appl. No.: 83,845

[22] Filed: Jun. 25, 1993

[51] Int. Cl.$^6$ .............................. G01B 9/02; G01B 11/00
[52] U.S. Cl. .......................... 356/351; 356/345; 356/359; 356/363
[58] Field of Search ................................... 356/345, 351, 356/354, 359, 363

[56] References Cited

U.S. PATENT DOCUMENTS

| | | | |
|---|---|---|---|
| 4,576,479 | 3/1986 | Downs | 356/351 |
| 4,671,657 | 6/1987 | Calvani et al. | 356/351 |
| 5,067,813 | 11/1991 | Ishizuka et al. | 356/351 |
| 5,126,876 | 6/1992 | O'Meara | 359/338 |
| 5,305,330 | 4/1994 | Rieder et al. | 356/351 |
| 5,331,400 | 7/1994 | Wilkening et al. | 356/351 |

OTHER PUBLICATIONS

Rockwell, "A Review of Phase–Conjugate Solid–State Lasers", *IEEE Journal of Quantum Electronics*, vol. 24, No. 6, Jun. 1988, pp. 1124–1140.
Saleh et al., *Fundamentals of Photonics*, John Wiley & Sons, Inc., 1991, pp. 223–233.
Basov et al., "Laser interferometer with wavefront–reversing mirrors", *Sov. Phys. JTEP*, vol. 52, No. 5, Nov. 1980, pp. 847–851.
Andreev et al., "Locked Phase Conjugation for Two–Beam Coupling of Pulse Repetition Rate Solid–State Lasers", *IEEE J. of Quantum Electronics*, vol. 27, No. 1, Jan. 1991, pp. 135–141.
Andreev et al., "Applications of Brillouin Cells to High Repetition Rate Solid–State Lasers", *IEEE J. of Quantum Electronics*, vol. 28, No. 1, Jan. 1992, pp. 330–341.
Andreev et al. "Single–mode YAG:Nd laser with a stimulated Brillouin scattering mirror & conversion of radiation to the second & fourth harmonics", *Sov. J. Quantum Electronics*, vol. 21, No. 10, Oct. 1991, pp. 1045–1051.

*Primary Examiner*—Rolf Hille
*Assistant Examiner*—David Ostrowski
*Attorney, Agent, or Firm*—V. D. Duraisawamy; W. K. Denson-Low

[57] ABSTRACT

An interferometer that is used with a frequency shifting phase conjugate mirror (PCM), to produce a 90° polarization rotation, employs only two adjustable elements: a specially shaped prism, and a beam deflector that is preferably a porro prism. The primary prism is shaped and oriented so that a linearly polarized input beam is divided into ordinary (o) and extraordinary (e) subbeams. One of the subbeams is refracted out of the prism along a controlled length path, and then returned back into the prism by the deflector. The second subbeam is retained within the prism by total internal reflection, and directed onto a exit path that coincides with the path of the first subbeam after its reentry into the prism. The recombined output beam is directed into the PCM, from which it is reflected back into the prism for a reverse pass. The difference in path lengths between the o and e subbeams is selected to produce a net 90° polarization rotation after both passes.

22 Claims, 3 Drawing Sheets

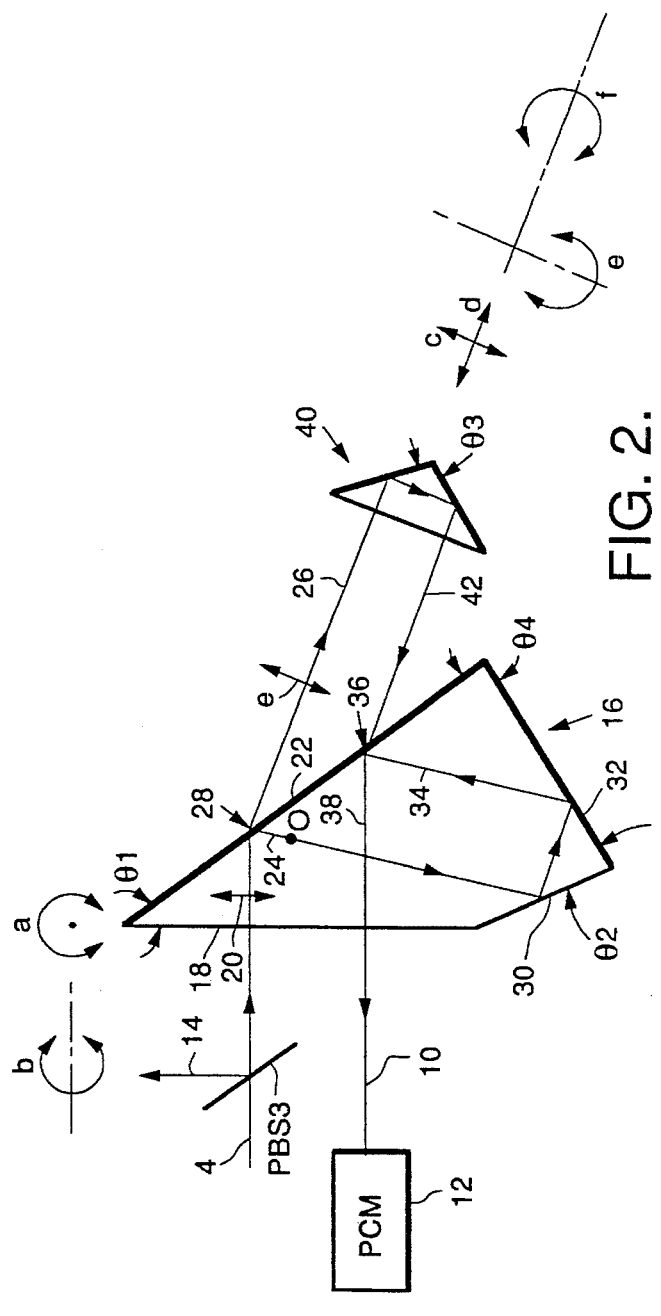
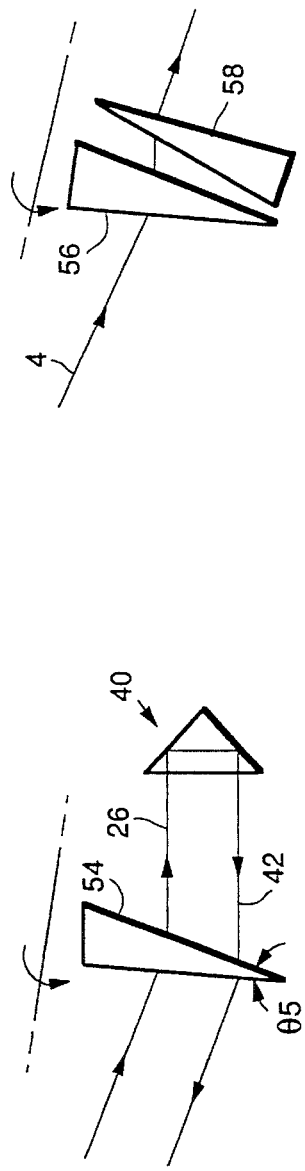
FIG. 2.
FIG. 4.
FIG. 5.

POLARIZATION ROTATOR WITH FREQUENCY SHIFTING PHASE CONJUGATE MIRROR AND SIMPLIFIED INTERFEROMETRIC OUTPUT COUPLER

BACKGROUND OF THE INVENTION

1. Field of the Invention

This invention relates to systems for rotating the polarization of a linearly polarized beam, and more particularly to systems that employ a bidirectional interferometric coupler in the optical path leading to and from a frequency-shifting phase conjugate mirror (PCM) to produce a net polarization rotation.

2. Description of the Related Art

There are several applications in which the polarization angle of a linearly polarized beam needs to be rotated. Of particular concern are high power laser designs in which an input laser beam is amplified by a system that includes a PCM. Such systems are described in Rockwell, "A Review of Phase-Conjugate Solid-State Lasers", *IEEE Journal of Quantum Electronics*, Vol. 24, No. 6, June 1988, pages 1124–1140. In such systems the output beam is returned along the same path as the input, but in the opposite direction. The polarization of the output beam is rotated 90° from the linearly polarized input beam, thereby allowing a polarizing beamsplitter to separate the low power input from the high power output beam.

A number of ways have been developed to produce a 90° polarization rotation. One method uses a Faraday rotator, based upon the Faraday effect, in which certain materials act as polarization rotators when placed in a static magnetic field, with the sense of rotation governed by the magnetic field direction. The direction of rotation does not reverse when the beam direction is reversed, so that a beam that makes two passes through a Faraday rotator in opposite directions undergoes twice the rotation. Faraday rotators are described in Saleh et al., *Fundamentals of Photonics*, John Wiley & Sons, Inc., 1991, pages 223–233.

Although Faraday rotators achieve acceptable and reliable performance, they are relatively expensive, and large aperture devices are quite large and heavy because of the requirement for a uniform magnetic field to induce the polarization rotation. This is particularly troublesome for applications such as laser cutting and welding devices, which employ a focusing head that has relatively small weight limitations. These weight limits are difficult to meet with a Faraday rotator.

Another approach to polarization rotation uses an interferometric output coupler (IOC) that couples a beam into and out of a multi-pass phase conjugate amplifier chain. It exploits the fact that a PCM that is based upon Brillouin scattering imposes a frequency shift upon its output beam; this frequency shift is used by the IOC to produce a 90° polarization rotation. The input beam passes through the interferometer, which alters its polarization, on the way to the PCM. After processing by the PCM, the return beam is directed back in the opposite direction through the interferometer, and undergoes a polarization alternation in the opposite sense to its first pass. However, since its frequency has been shifted, the return beam's polarization is altered by a different amount than the input beam's. The system is set up so that this difference translates to a 90° polarization rotation.

The basic operation of an interferometer of this type is illustrated in FIG. 1. It includes a pair of polarizing beamsplitters PBS1 and PBS2, a pair of folding mirrors M1 and M2, and a porro prism 2. The input beam 4 is assumed to be linearly polarized at an angle of 45° relative to the plane of the drawing. This is illustrated by the polarization vectors A, B and C, which are taken looking along the axis of input beam 4. Vector A represents the beam's polarization at a particular instant in time, and includes equal components Ay and Ax in the vertical and horizontal directions, respectively. (The terms "vertical" and "horizontal" are arbitrary, and are used herein only for ease of explanation to illustrate the division of a polarization vector into mutually orthogonal components.) Vector B represents the polarization one-half period later, at the input beam frequency, when it is directed 180° to the initial vector A. Vector B consists of equal vertical and horizontal components By and Bx, which are reversed 180° from Ay and Ax, respectively. The polarization components in the vertical and horizontal directions are in phase with each other, reaching their maximum positive and maximum negative extents simultaneously with each other. The resultant linear polarization over time is illustrated by vector C.

The input beam 4 is transmitted through a polarizing beamsplitter PBS3, which is oriented to transmit the input beam but to reflect a beam whose polarization is rotated 90° with respect to the input beam. The input beam's polarization is not changed by the beamsplitter PBS3, and includes equal and in-phase vertical and into-the-page components y and x.

The polarizing beamsplitter PBS1 splits the input beam into two equal, orthogonally polarized subbeams 6 and 8 that respectively propagate towards the prism 2 and the mirror M2. The subbeam 6 retains the into-the-page polarization x of the original input beam, while subbeam 8 retains the vertical polarization y. Subbeam 6 is reflected back, parallel to but offset from its original path, by the prism 2, and is then reflected by mirror M1 onto the second polarizing beamsplitter PBS2. The second subbeam 8 propagates directly to mirror M2, from which it is also reflected onto PBS2.

The various system elements are oriented so that the two subbeams 6 and 8 are recombined by PBS2 into a single net beam 10, which is directed into a PCM 12. However, it can be seen that subbeam 6 has traveled a longer path between PBS1 and PBS2 than has subbeam 8. Specifically, the extension of the path for subbeam 6 to and from the prism 2 results in this travel differential (there will normally be some differential even without the addition of the extra path length due to prism 2). In general, this travel differential results in the x and y polarization components of the recombined beam 10 being out-of-phase with each other. This is illustrated by the polarization vectors D, E and F associated with the recombined beam 10; these vectors are again taken looking along the beam axis. At the particular instant when vector D occurs, its vertical component Dy is at its maximum positive extent, while its horizontal component Dx is illustrated as being at only a portion of its maximum positive extent. The situation one-half period later is illustrated by vector E, whose vertical component Ey is at its maximum negative extent, but whose horizontal component Ex is at only a portion of its maximum negative extent. The resulting polarization state F of the recombined beam is generally elliptical over time.

The recombined beam 10 is reflected by the stimulated Brillouin scattering PCM 12 and returns to PBS2. From there it is divided into orthogonally polarized components that travel through the interferometer in a reverse pass from the original subbeams 6 and 8, and are recombined as an output beam at PBS1. The optical path lengths of the two subbeams are made unequal by an amount ΔL. This differential is set by an appropriate positioning of prism 2 such that ΔkΔL=π, where Δk is the wavevector difference arising from the frequency difference between the input and output beams. This conditions ensures that, after the return beam completes its pass through the interferometer, the final output beam polarization is orthogonal to the input polarization. The output beam 14 is then deflected by PBS3 to separate it from the input beam.

The output beam polarization is illustrated by polarization vectors G, H and I. Since the polarization has been rotated 90° from the input beam, the vertical and horizontal components Gy and Gx of vector G are 180° out-of-phase with each other, with the vertical component Gy reaching its maximum positive extent at the same time the horizontal component Gx reaches its maximum negative extent. One-half period later (at the new frequency imposed by the phase conjugator), the polarization vector H has vertical and horizontal components Hy and Hx that are respectively at their maximum negative and positive extents, 180° from their orientations for vector G. The result is an output linear polarization I that is rotated 90° with respect to the input linear polarization C.

The various elements of the FIG. 1 system have been described in a number of publications, specifically, Basov et al., "Laser interferometer with wavefront-reversing mirrors", *Sov. Phys. JTEP*, Vol. 52, No. 5, November 1980, pages 847–851; Andreev et al., "Locked Phase Conjugation for Two-Beam Coupling of Pulse Repetition Rate Solid-State Lasers", *IEEE J. of Quantum Electronics*, Vol. 27, No. 1, January 1991, pages 135–141; Andreev et al., "Applications of Brillouin Cells to High Repetition Rate Solid-State Lasers", *IEEE J. of Quantum Electronics*, Vol 28, No. 1, January 1992, pages 330–341; and Andreev et al., "Single-mode YAG:Nd laser with a stimulated Brillouin scattering mirror and conversion of radiation to the second and fourth harmonics", *Sov. J. Quantum Electronics*, Vol. 21, No. 10, October 1991, pages 1045–1051.

When implemented in practice, the IOC concept of FIG. 1 suffers from the fact that it involves five separate optical components. These components must be precisely aligned to ensure that the two output beam components are parallel and perfectly overlapping spatially as they leave PBS2, after the first pass through the interferometer. Alternate configurations are described within the articles referenced above that reduce the number of components to three, but they still require sensitive alignments relative to one another. The adjustment mechanisms that are necessary to precisely align the various components work against the desired reduction in weight, size and complexity.

SUMMARY OF THE INVENTION

This invention seeks to provide an improved interferometer, particularly adapted for use with a frequency shifting PCM to produce a 90° polarization rotation, that is lighter, smaller and simpler than prior systems, employs only two optical components, and requires only three sensitive alignments.

These goals are achieved by substituting a single uniaxial anisotropic prism for the polarizing beamsplitters and two mirrors of the prior IOC described above. The prism is shaped and oriented so that an input beam is divided into ordinary (o) and extraordinary (e) subbeams. One of the subbeams is refracted out of the prism and then deflected, preferably by a porro prism, back into the prism. The second subbeam is reflected by total internal reflection (TIR) within the prism onto an exit path that coincides with the path of the first subbeam after its re-entry into the prism. The recombined output beam is directed into a frequency shifting PCM, from which it is reflected back into the prism for a second pass that reverses the paths of the in-put subbeams. The beam deflector is positioned so that the difference in path lengths of the o and e subbeams during the two passes through the prism produce a net 90° polarization rotation.

The prism is oriented with a front surface orthogonal to the input beam, a rear surface at approximately the Brewster angle to the input beam, and side surfaces that form a corner reflector to keep the second subbeam within the prism by TIR. The prism's rear surface thus performs the functions of both the prior PBS1 and PBS2, while its side surfaces perform the functions of the two mirrors M1 and M2. There are only three critical adjustments: (1) the relative angle between the input beam and the prism; (2) the relative angle between the first input subbeam and the beam deflector; and (3) the distance between the prism and the beam deflector. The first two adjustments can be made by either rotating the prism and beam deflector, or by adjusting the beam angle relative to these elements. The preferred material for the prism is calcite.

These and other features and advantages of the invention will be apparent to those skilled in the art from the following detailed description, taken together with the accompanying drawings.

BRIEF DESCRIPTION OF THE DRAWINGS

FIG. 2 is a diagram of a polarization rotator in accordance with the invention, incorporating a PCM and an improved IOC;

FIGS. 4 and 5 are diagrams of beam adjustment mechanisms that can be used in place of the mechanical adjustments illustrated in FIG. 3.

DETAILED DESCRIPTION OF THE INVENTION

Figure 1:
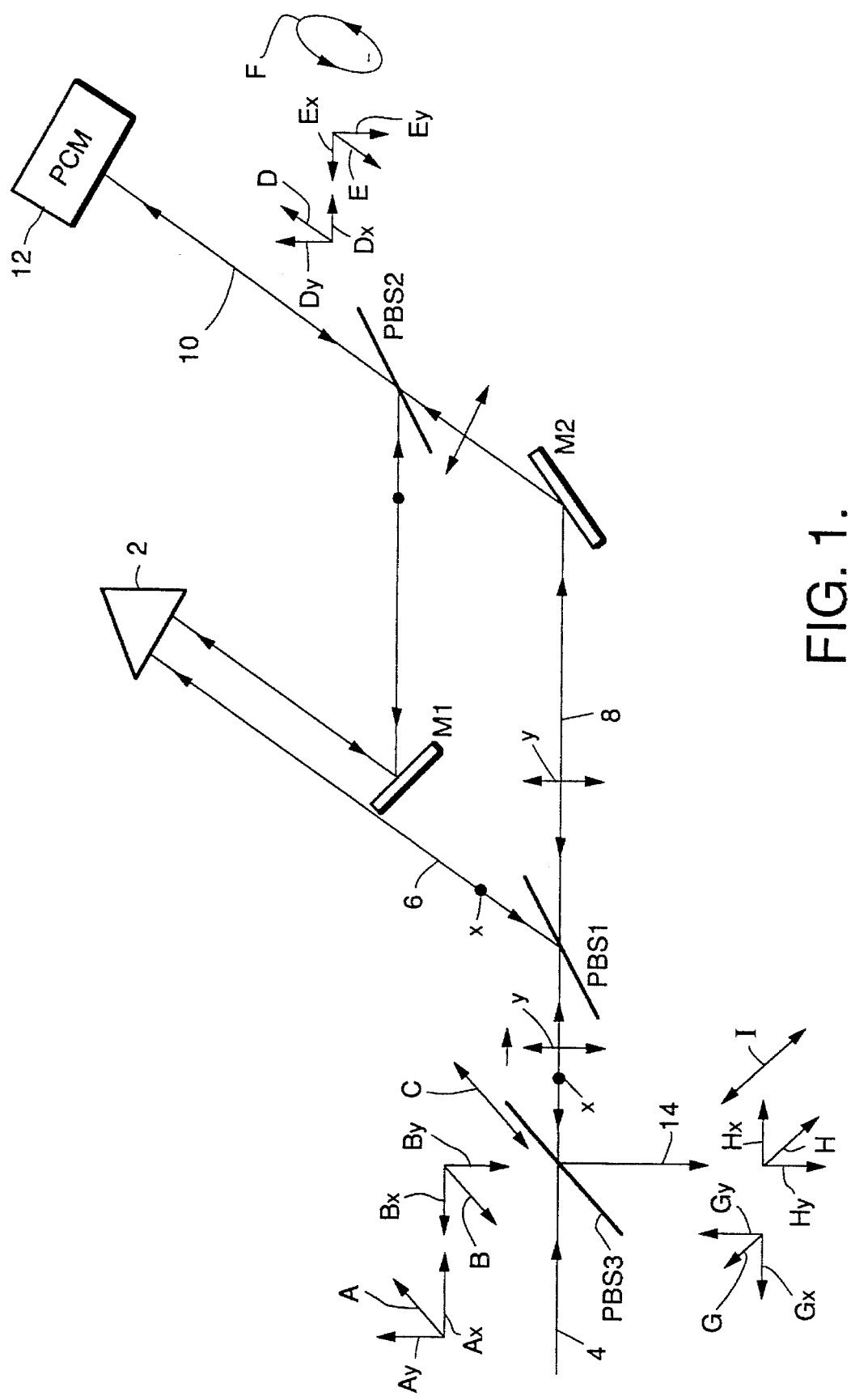
FIG. 1 is a diagram of a prior art polarization rotator incorporating a PCM and an IOC, described above.

The present invention greatly simplifies the prior IOC by substituting a single integral optical element for the two beamsplitters PBS1 and PBS2 and the two mirrors M1 and M2 employed previously. This allows for a substantial reduction in the system's overall size and weight, and also considerably reduces the number of adjustments necessary to precisely align the system. The new IOC, illustrated diagrammatically in FIG. 2, operates in conjunction with a frequency shifting PCM 12 to produce the polarization rotation; the characteristics of the input beam 4, the beam 10 that is delivered to the PCM, and the ultimate output beam 14 can be the same as in the prior system. The overall processing of the beam between the input and the PCM, and from the PCM back through the IOC to the output, is analogous to the beam processing in the prior system, but the system itself is considerably less complex.

The bulk of the IOC processing is performed in a single anisotropic prism 16, which is preferably uniaxial. An anisotropic material is one whose optical properties vary in accordance with a received beam's direction and polarization relative to the prism axes, while a uniaxial material is one whose optical properties are the same for two axes but different for the third axis. In the conventional notation for uniaxial materials, the two axes whose optical properties are the same are denoted a and b, while the third axis whose optical properties are different is denoted the c axis. Calcite is the preferred material for the prism 16, since it exhibits a large uniaxial anisotropy and is available in large crystals. Other uniaxial anisotropic materials such as quartz could also be used, although quartz exhibits a lower degree of anisotropy.

The prism 16 has a special shape that allows it to perform all of the functions of the prior IOC except for the porro prism 2. The prism is shaped so that both its front surface 18 and its c axis 20 can be oriented orthogonal to the input beam 4. In the proper prism orientation, the rear prism surface 22 is angled relative to the front surface so as to separate the input beam into an ordinary (o) subbeam 24 that is reflected back within the prism from the rear surface by TIR, and an extraordinary (e) subbeam 26 that is refracted out of the prism along an exit path determined by the angle of the rear surface.

For a calcite prism and a beam wavelength of 1 μm, the refractive index $n_o$ for the o ray is 1.64276, while the refractive index $n_e$ for the e ray is 1.47985. The critical angles for TIR are thus 37.5° and 42.5° for the o and e rays, respectively. The desired separation of the input beam into o and e subbeams, one of which is retained within the prism by TIR and the other of which is refracted out of the prism, is achieved by selecting an angle θ1 between the prism's front and rear surfaces 18 and 22 that is within the critical angles. The preferred angle for calcite is 38.5° (which is close to the Brewster angle of 34° within the calcite), at which the e subbeam 26 is transmitted through the rear prism surface with minor reflective loss. While the e subbeam exits the prism and the o is retained within the prism for calcite, other materials such as quartz can exhibit an $n_o$ that is less than $n_e$ at certain beam wavelengths, in which case the o subbeam would exit the prism while the e subbeam undergoes TIR.

With the input beam 4 assumed to be linearly polarized at an angle of 45° out of the plane of the page with respect to the calcite c-axis 20, each of the subbeams 24 and 26 into which it is split at point 28 on the rear prism surface carries half of the initial input beam power.

The prism 16 further includes side surfaces 30 and 32 that are perpendicular to each other, and oriented with respect to the rear surface 22 to form a corner reflector. The o subbeam 24 is redirected by TIR at the corner reflector back along a path 34 that is parallel to, but offset from, its initial path after TIR from the rear prism surface. The reflected subbeam thus reaches a different location 36 on the rear prism surface, from which it is reflected by TIR onto an exit path 38 from the prism. The exit path 38 is parallel to the input beam 4, and is thus orthogonal to the front prism surface 18 so that the subbeam exits the prism without refraction.

A beam deflector 40, preferably in the form of a conventional porro prism, is placed in the path of the e subbeam 26 that is refracted out of the prism 16. The e subbeam is redirected by the porro prism back towards the primary prism 16 along a parallel path 42 that reaches the rear prism surface at the same location 36 as the reflected o subbeam along path 34. Since the return path of the e subbeam is parallel to its exit path from the prism 16, it is refracted at the rear prism surface onto the same exit path 38 as the o subbeam, parallel to the input beam 4. The o and e subbeams thus recombine along a common exit path from the prism 16, emerging as the polarization rotated output beam 10. One of the advantages of the invention is that no coatings are required on the prisms, except for a standard anti-reflection coating on the input face 18 of prism 16, and the input/output face of the porro prism 40.

The division of the linearly polarized input beam 4 into o and e components at the rear prism surface 22 is analogous to the operation of beamsplitter PBS1 in the prior interferometer of FIG. 1 in dividing the input beam into orthogonally polarized components, while the recombination of the o and e subbeams at location 36 at the rear prism surface is analogous to the operation of beamsplitter PBS2 in the prior interferometer. The position of porro prism 40 is controlled so that the ΔkΔL=π condition for a 90° polarization rotation, after forward and reverse passes through the interferometer (before and after processing by the PCM 12), is satisfied.

The alignment requirements for the described system are much less complex than for prior systems that require a greater number of components. The simplified alignment requirements will now be discussed. Assume that all of the surfaces shown in FIG. 2 as being normal to the plane of the figure are normal to within typical high quality optical finishing tolerances. Assume further that the corner reflector angles θ2 and θ3 in the primary prism 16 and porro prism 40 are very nearly equal to 90° (tolerances of about $6 \times 10^{-4}$ degrees or 2 arc-seconds are presently achievable). Errors in the angle θ1 between the primary prism's front and rear surfaces can be compensated by adjusting the prism orientation such that the input beam's angle of incidence at point 28 on the rear surface is 38.5°, as specified. This is adjustment rotation "a" in FIG. 2, about an axis that is orthogonal to the common plane of the input beam 4 and the prism's c-axis 20. Errors in the angle θ4 between the prism's rear surface 22 and the adjacent side surface 32 are relatively insignificant, due to the retro-reflecting property of the 90° faces at θ2. One impact of an error in θ4 is simply a slight translation of the location 36 along the rear surface 22, which has no serious consequences. A deviation in θ4 from its nominal value also changes the o subbeam's angle of incidence at the side surfaces 30 and 32; the nominal θ4 value of 83.5° produces angles of incidence at the side surfaces of 45°. Since the angle of incidence need only be greater than 37.5° to ensure TIR, the tolerance in θ4 is approximately ±6.5°.

The remaining angular degree of freedom "b" for the primary prism is a rotation about an axis parallel to the input beam (orthogonal to the prism's front surface 18). This is adjusted to set the input linear polarization at 45° to the prism's c-axis. The tolerance for this adjustment is fairly loose, since a small offset from an absolutely 50:50 split of the input beam power between the o and e subbeams has only a small effect on the system operation. Accordingly, the only sensitive adjustment for the primary prism 16 is the rotational adjustment "a", which ensures that the input beam has the desired angle of incidence on the front prism surface 18.

For the porro prism 40, the first adjustment to be considered is a translation "c" in a direction orthogonal to the e subbeam 26 and coplanar with the prism's c-axis. A translation of the porro prism along direction c varies the separation between the forward and return paths of the e subbeam, before and after reflection from the prism. This allows the position of the e subbeam to be adjusted so that it spatially overlaps the o subbeam after reentry into the primary prism at location 36. The c adjustment has a relatively loose tolerance, about 0.25–0.5 mm for typical beam sizes of about 5–10 mm.

An adjustment of the porro prism in the "d" direction, parallel to the e subbeam, establishes the required optical path length difference between the o and e subbeams. For typical stimulated Brillouin scattering liquids at a wavelength of 1 micrometer, this path length difference is about 5 cm and the tolerance is about 1 mm.

The rotational adjustment e about the c translation axis is relatively sensitive, since it must be adjusted properly for the o and e subbeams to be parallel and to spatially overlap at location 36 on the primary prism's rear surface. However, a rotational adjustment "f" about the d translation axis, which is used to match the rotational b adjustment of the primary prism, is subject to relatively loose tolerances similar to those of the b adjustment.

Figure 3:
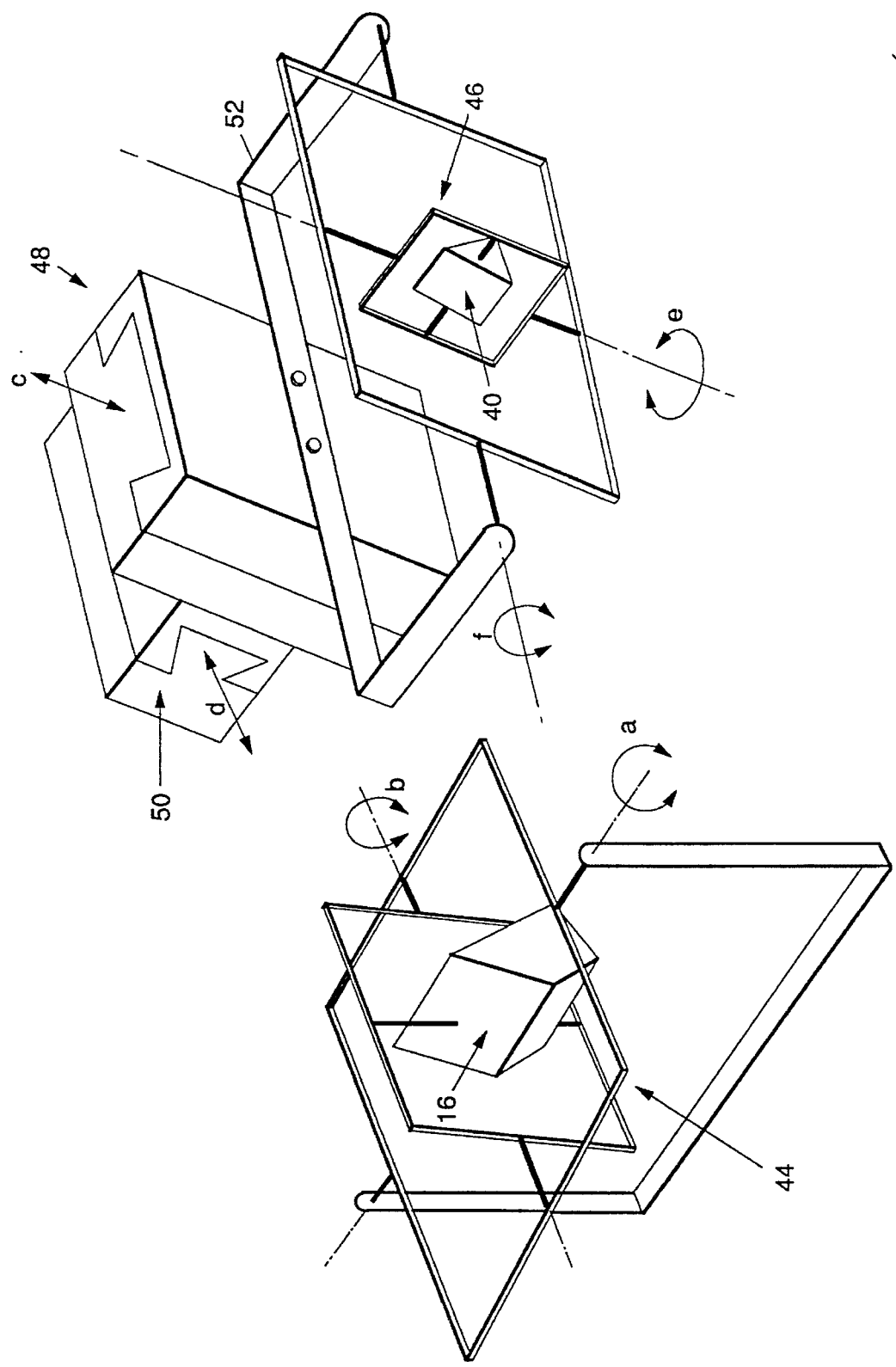
FIG. 3 is a perspective view of a system as illustrated in FIG. 2, showing alignment mechanisms that can be used for the optical elements of the IOC.

The only relatively high precision adjustments are thus those designated as "a", "c" and "e". One approach to providing the various alignment adjustments, both sensitive and insensitive, is illustrated in a generic sense in FIG. 3. The primary and porro prism 16 and 40 are each supported for rotation about a pair of orthogonal axes by gimbal structures 44 and 46, respectively. The gimbal 44 is setup to rotate the primary prism 16 about the a and b axes illustrated in FIG. 2, while the second gimbal 46 is set up to rotate the porro prism 40 about the e and f axes. To translate the porro prism in the c and d directions, a pair of dovetailed slides 48 and 50 are provided. The frame 52 of gimbal 46 is attached to slide 48, which translates in the c direction, while the whole assembly is mounted on the slide 50, which translates in the d direction. The gimbals and slides are adjusted and retained at their adjusted positions by conventional mechanisms.

Although standard gimbal mounts provide the necessary degrees of freedom for most applications, such devices can exhibit instability with respect to misalignments when they are subjected to rigorous shock, vibration and thermal environments. In such cases, the prisms can be held against rotational movement and the beams themselves deflected to produce the desired adjustments in relative angles between the beams and prisms. A preferred way to achieve angular alignments is to pass a beam through refractive wedges that are formed from a transparent material such as quartz, and to rotate the wedges about the beam axis.

This type of arrangement is illustrated in FIG. 4 for the e beam that is directed onto and reflected back from the porro prism 40; it could also be used to adjust the input beam prior to reaching the primary prism 16. The wedge angle $\theta 5$ is typically about 0.5° (it is exaggerated in the figure for clarity). The wedge 54 is positioned so that it intercepts both the incident and reflected beams 26 and 42 of the porro prism 40. Rotating the wedge about an axis parallel to the beams scans the incident beam 26 in a cone about its initial direction from the primary prism. The cone has one projection in the plane of the drawing, and another projection normal to the plane of the drawing; the latter projection is the desired beam alignment relative to the porro prism. The first projection simply tilts the beam in the retro-reflecting plane of the porro prism; this projection is compensated during the second pass through the wedge on the return pass 42. Accordingly, the net effect of the wedge is to tilt the beam in a plane normal to the plane of the drawing. This arrangement can be employed to provide the angular adjustment e indicated in FIG. 2.

An advantage of an alignment wedge is that, to the lowest order, a wedge tilt does not introduce an angular misalignment; the wedge can only misalign the beam if it is allowed to rotate about its axis. Once the wedge has been rotated to produce the desired angle between the beam and the prism, the wedge's mount is locked to prevent further rotation.

To adjust the beam angle within a single plane, as required for alignment "a" in FIG. 2, a pair of counter-propagating wedges can be used. This is illustrated in FIG. 5, in which two wedges 56 and 58 having identical wedge angles are positioned in the path of the input beam 4 prior to its reaching the primary prism 16. The prisms rotate about a common axis in opposite directions, and can be held by a common mount. Such a dual-wedge device offers the same alignment stability as the single-wedge device illustrated in FIG. 4. This type of alignment assumes that the plane in which the two wedges 56 and 58 scan the beam is approximately coincident with the plane of incidence at location 28 on the primary prism's rear surface (the plane of incidence is the plane that contains the input beam 4, and the o and e subbeams 24 and 26 into which it is divided). This alignment tolerance is fairly lenient, and can be achieved by placing shims under one edge of a plate upon which the primary prism is mounted.

Using the same approach of rotating an optical component to achieve the desired alignment, a half-wave plate can be placed in the path of the input beam to orient the input beam's polarization at the primary prism 16 at 45° relative to the c-axis (alignment "b" in FIG. 2). It is well known that a half-wave plate rotates the plane of polarization of a linearly polarized beam at twice the angular rate at which the plate itself is rotated.

For the linear translations c and d of FIG. 2, the slides 48 and 50 can be provided with multiple pins along one of their elements that travel along slots in the complementary slide elements; the pins prevent any significant angular misalignment during translation. It is generally best to make the translation adjustment prior to making the final angular adjustment. A lead screw can be utilized to control the translation, and a locking screw to ensure that the translation does not change significantly following alignment. The remaining alignment, donated "f" in FIG. 2, can be achieved with the use of shims against the porro prism mount.

Regardless of the particular adjustment mechanism used, the reduction in the number of separate elements that need to be aligned with each other results in a significant improvement in reliability, along with reductions in size, weight and system complexity. While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. An interferometer for altering the polarization of a polarized input beam, comprising:

an anisotropic prism that is uniaxial with respect to a c axis, said prism held by said support and including front, rear and multiple side surfaces, said prism being positionable to receive said input beam at its front surface, said rear prism surface lying in a plane that is angled to said front surface so as to receive said input beam at a first location after the beam has crossed the prism from said first surface, to refract a first one of the extraordinary (e) and ordinary (o) subbeams of said input beam out of the prism, and to reflect a second of said e and o subbeams towards said side surfaces by total internal reflection (TIR), said side surfaces being oriented to reflect said second subbeam by TIR back to said rear surface at a second location that is offset from said first location and at an angle such that said second subbeam is reflected by TIR off said rear surface on an exit path that exits the prism, a first adjustment mechanism for adjusting the relative angle between the input beam and prism so that the prism's rear surface refracts one of the input beam's o and e subbeams and reflects the other subbeam by TIR, a beam deflector, a deflector support supporting said beam deflector in the path of said first subbeam to redirect said first subbeam back to the prism's rear surface at said second location, at an angle such that said first subbeam recombines with said second subbeam on said exit path, and a second adjustment mechanism for adjusting the relative angle between the first subbeam and the beam deflector to correct for errors in said angle, said deflector support being adjustable to hold said beam deflector at a position at which the first subbeam travels a path whose length differs from the path traveled by said second subbeam prior to their recombination, so as to alter the recombined beam's polarization relative to the input beam polarization.

2. The interferometer of claim 1, wherein said first adjustment mechanism enables a rotational adjustment of the prism's position about an axis that is orthogonal to the plane of the input beam and the prism's c-axis.

3. The interferometer of claim 1, wherein said first adjustment mechanism enables an adjustable angular deflection of the input beam relative to the prism.

4. The interferometer of claim 1, wherein said beam deflector comprises a porro prism for deflecting said first subbeam back to the prism's rear surface substantially parallel to its path from the prism to the deflector.

5. The interferometer of claim 4, wherein said deflector support enables a linear adjustment of the deflector along an adjustment axis that is orthogonal to the first subbeam and coplanar with the prism's c-axis, and the second adjustment mechanism enables a rotational adjustment of the deflector about said adjustment axis.

6. The interferometer of claim 4, wherein said deflector support enables a linear adjustment of the deflector along an adjustment axis that is orthogonal to the first subbeam and coplanar with the prism's c-axis, and the second adjustment mechanism enables an angular adjustment of the first subbeam.

7. The interferometer of claim 1, said prism side surfaces forming a corner reflector for said second subbeam so that, after redirection by said corner reflector, the second subbeam is reflected off the rear prism surface by TIR along a path that is substantially anti parallel to but offset from said input beam path.

8. The interferometer of claim 1, wherein said prism is formed from calcite, and said first adjustment mechanism is capable of adjusting the prism so that its rear surface is at an angle of about 38.5° to the input beam.

9. The interferometer of claim 1, wherein said first adjustment mechanism holds said prism with its rear surface at approximately the Brewster angle to the input beam.

10. The interferometer of claim 1, wherein said prism is formed from calcite.

11. The interferometer of claim 1, for a linearly polarized input beam, wherein said first adjustment mechanism enables said prism to be positioned with its c axis at substantially a 45° angle to the input beam's polarization.

12. An apparatus for rotating the polarization of a forward directed linearly polarized input beam, comprising:

a shaped anisotropic prism positioned in the input beam path and having a surface oriented to separate the input beam into ordinary (o) and extraordinary (e) subbeams, said prism being shaped to direct a first one said subbeams out of the prism along a first exit path, and to direct the second of said subbeams out of the prism along a second exit path that includes total internal reflection (TIR) prior to exiting the prism, said prism including a front surface for receiving said input beam, and a rear surface that is uncoated and is oriented at an angle to said input beam after it has crossed the prism from the front surface, the angle of said rear surface being selected to effect said separation into said e and o subbeams, a beam deflector positioned in the path of said first subbeam after it exits said prism to redirect said first subbeam back into the prism for recombination with said second subbeam along said second exit path, said beam deflector being spaced from said prism such that the relative phase of the o and e beam polarizations after recombination is different from their relative phase immediately after being separated from the input beam, and means for shifting the frequency of said recombined beam, and for redirecting said recombined beam in the reverse direction back through said prism so that said frequency shifted beam is separated into o and e subbeams that travel in the reverse direction along the paths of the input beam's o and e subbeams and acquire a phase differential before being recombined into an output beam, the distance between said beam deflector and said prism being selected so that, for the frequency shift imparted by said frequency shifting means, the net phase differential between the o and e subbeams in the forward and reverse directions imparts a linear polarization to the return beam that is rotated relative to the input beam polarization.

13. The polarization rotation apparatus of claim 12, wherein the distance between said beam deflector and said prism is selected to rotate the polarization of the return beam 90° relative to the input beam polarization.

14. The apparatus of claim 12, said prism including side surfaces that are oriented to redirect said second input subbeam by TIR back onto a different location on said rear surface from where said beam separation occurs, said redirected second input subbeam reaching said rear prism surface at an angle such that it undergoes TIR at said surface along said second exit path.

15. The apparatus of claim 14, said prism side surfaces forming a corner reflector for said second input subbeam so that, after redirection by said corner reflector, the second input subbeam is reflected off the rear prism surface by TIR along a path that is substantially parallel to but offset from said input beam path.

16. The apparatus of claim 15, wherein the front surface of said prism is oriented substantially orthogonal to said input beam.

17. The apparatus of claim 16, said beam deflector redirecting said first input subbeam back to substantially the same location on the prism's rear surface as the location where the second input subbeam is reflected off said rear surface by TIR, and along a path substantially parallel to the first input subbeam's exit path from the prism, whereby the first input subbeam is redirected substantially onto the second beam's exit path by refraction at said rear prism surface.

18. The apparatus of claim 17, said beam deflector comprising a porro prism.

19. The apparatus of claim 12, wherein said prism is oriented with its rear surface at approximately the Brewster angle to the input beam.

20. The apparatus of claim 12, wherein said prism is formed from calcite.

21. The apparatus of claim 12, for a linearly polarized input beam, wherein said prism is oriented with its c axis at substantially a 45° angle to the input beam's polarization.

22. The apparatus of claim 12, said frequency shifting mechanism comprising a phase conjugate mirror (PCM).

* * * * *